United States Patent
Naimer et al.

(10) Patent No.: US 7,205,907 B2
(45) Date of Patent: Apr. 17, 2007

(54) NON LINEAR TAPE DISPLAY

(75) Inventors: Joachim Laurenz Naimer, Ascona (CH); Sam Hyatt, Alpharetta, GA (US); Jim Brannen, Lawrenceville, GA (US); Tom Lawrence, Knoxville, TN (US)

(73) Assignee: Universal Avionics Systems Corporation, Norcross, GA (US)

( * ) Notice: Subject to any disclaimer, the term of this patent is extended or adjusted under 35 U.S.C. 154(b) by 33 days.

(21) Appl. No.: 10/662,485

(22) Filed: Sep. 15, 2003

(65) Prior Publication Data
US 2005/0057377 A1 Mar. 17, 2005

(51) Int. Cl.
*G01C 21/00* (2006.01)

(52) U.S. Cl. .................... 340/978; 340/973; 701/4

(58) Field of Classification Search ............. 340/978, 340/973, 970, 974, 977, 979; 701/4
See application file for complete search history.

(56) References Cited

U.S. PATENT DOCUMENTS

| | | | | |
|---|---|---|---|---|
| 3,668,622 A | 6/1972 | Gannett et al. | ......... | 340/27 R |
| 4,247,843 A | 1/1981 | Miller et al. | ......... | 340/27 NA |
| 4,750,127 A | 6/1988 | Leslie et al. | ......... | 364/428 |
| 4,774,670 A | 9/1988 | Palmieri | ......... | 364/446 |
| 4,860,007 A * | 8/1989 | Konicke et al. | ......... | 340/973 |
| 4,914,733 A | 4/1990 | Gralnick | ......... | 340/961 |
| 5,179,377 A | 1/1993 | Hancock | ......... | 340/961 |
| 5,185,606 A | 2/1993 | Verbaarschot et al. | ......... | 340/961 |
| 5,227,786 A | 7/1993 | Hancock | ......... | 340/961 |
| 5,248,968 A | 9/1993 | Kelly et al. | ......... | 340/961 |
| 5,250,947 A | 10/1993 | Worden et al. | ......... | 340/973 |
| 5,382,954 A | 1/1995 | Kennedy, Jr. et al. | ......... | 340/961 |
| 5,412,382 A * | 5/1995 | Leard et al. | ......... | 340/974 |
| 5,493,309 A | 2/1996 | Bjornholt | ......... | 342/455 |
| 5,668,542 A | 9/1997 | Wright | ......... | 340/971 |
| 5,739,770 A | 4/1998 | Liden | ......... | 340/976 |
| 5,739,771 A * | 4/1998 | Fisher | ......... | 340/978 |
| 5,844,504 A * | 12/1998 | Etherington | ......... | 340/973 |
| 5,872,526 A | 2/1999 | Tognazzini | ......... | 340/961 |
| 5,920,321 A | 7/1999 | Owen et al. | ......... | 345/427 |
| 6,085,150 A | 7/2000 | Henry et al. | ......... | 701/301 |
| 6,112,141 A * | 8/2000 | Briffe et al. | ......... | 701/14 |
| 6,154,151 A | 11/2000 | McElreath | ......... | 340/970 |
| 6,175,315 B1 * | 1/2001 | Millard et al. | ......... | 340/959 |
| 6,259,378 B1 | 7/2001 | Block | ......... | 340/963 |
| 6,271,768 B1 | 8/2001 | Frazier, Jr. et al. | ......... | 340/961 |
| 6,400,283 B1 | 6/2002 | Berlioz et al. | ......... | 340/975 |
| 6,507,288 B2 | 1/2003 | Block | ......... | 340/963 |
| 6,571,155 B2 | 5/2003 | Carriker | ......... | 701/3 |
| 6,683,541 B2 | 1/2004 | Staggs | ......... | 340/961 |
| 6,686,851 B1 * | 2/2004 | Gordon et al. | ......... | 340/970 |
| 2003/0132860 A1 | 7/2003 | Feyereisen | ......... | 340/973 |
| 2004/0113816 A1 | 6/2004 | Maris | ......... | 340/971 |
| 2004/0210355 A1 | 10/2004 | Gaidelis | ......... | 701/4 |

\* cited by examiner

*Primary Examiner*—John Tweel, Jr.
(74) *Attorney, Agent, or Firm*—Greenberg Traurig, LLP; John R. Wahl

(57) ABSTRACT

A graphical display of a nonlinear scale emulating the view of a mechanical drum gauge. The nonlinear scale may be used for the display of aircraft flight data including airspeed, altitude, heading, and other aircraft data suitable for presentation on a nonlinear scale. The nonlinear scale may scroll to display current aircraft data.

43 Claims, 3 Drawing Sheets

NON LINEAR TAPE DISPLAY

BACKGROUND AND SUMMARY OF THE INVENTION

Situational awareness refers to the degree of accuracy by which one's perception of his current environment mirrors reality. With regard to the operation of an aircraft, situational awareness relates to a pilot's perception of what is happening to the aircraft within the four dimensions of space and time. Situational awareness also relates to the pilot's comprehension of a present situation and a projection of the status of the aircraft into the near future.

During the operation of an aircraft, multiple operational parameters and systems must be monitored simultaneously, including the airspeed, attitude, engines, fuel management, navigation indicators, and weather radar. Many of these operational parameters and systems on the aircraft must be supervised by a pilot reacting to subtle changes in the alignment of needles on gauges or of pictorial displays on screens.

The present application claims new displays or presentations of aircraft data. The displays of the present invention employ commercially available systems that may be used without modification to supply the necessary signals to operate the displays of the present invention.

The present invention relates to improved displays of aircraft operation data that increase the situational awareness of a pilot and flight crew. More particularly, the displays of the present invention include an electronic display of a nonlinear scale emulating the view of a mechanical drum gauge. The nonlinear scale may be used for the display of aircraft flight data including airspeed, altitude, heading, and other aircraft data suitable for presentation on a nonlinear scale. The nonlinear scale may scroll to display current aircraft data. The nonlinear scale may center current aircraft data over a specific range of the scale. The nonlinear scale may display any typical unit related to the operation of an aircraft such as knots, meters, feet, miles, numbers, compass headings, and directional indicators. The nonlinear scale may be switchable between convertible units of measure such as feet and meters. The display of the present invention may include a window to show current aircraft data. The display of the current aircraft data may be enlarged, shown in a contrasting color, or shown on a specific background. The display of the present invention may include a pointer. The display of the present invention may have fixed upper or lower limits. The display of the present invention may have configurable upper or lower limits.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE EXAMPLE PREFERRED EMBODIMENTS

The example embodiments herein described are not intended to be exhaustive or to limit the invention to the precise forms disclosed. They are chosen and described to explain the principles of the invention and the application of the method to practical uses so that others skilled in the art may practice the invention.

The Primary Flight Display (PFD) utilized in the example embodiments of the present invention is a dynamic, color display of all of the parameters necessary for flight path control. A typical PFD provides data related to an aircraft in flight including heading, airspeed, altitude, attitude, and vertical speed.

Figure 1:
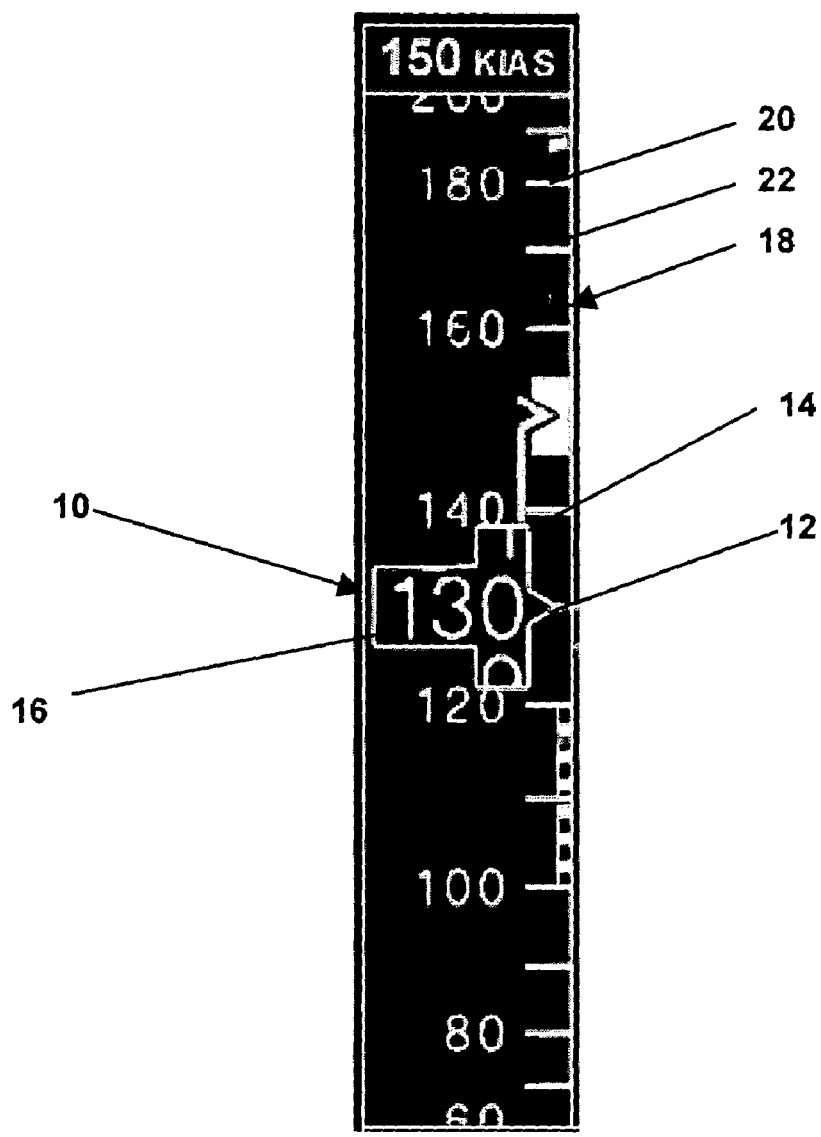
FIG. 1 illustrates an example embodiment of the airspeed display of the present invention.
Figure 2:
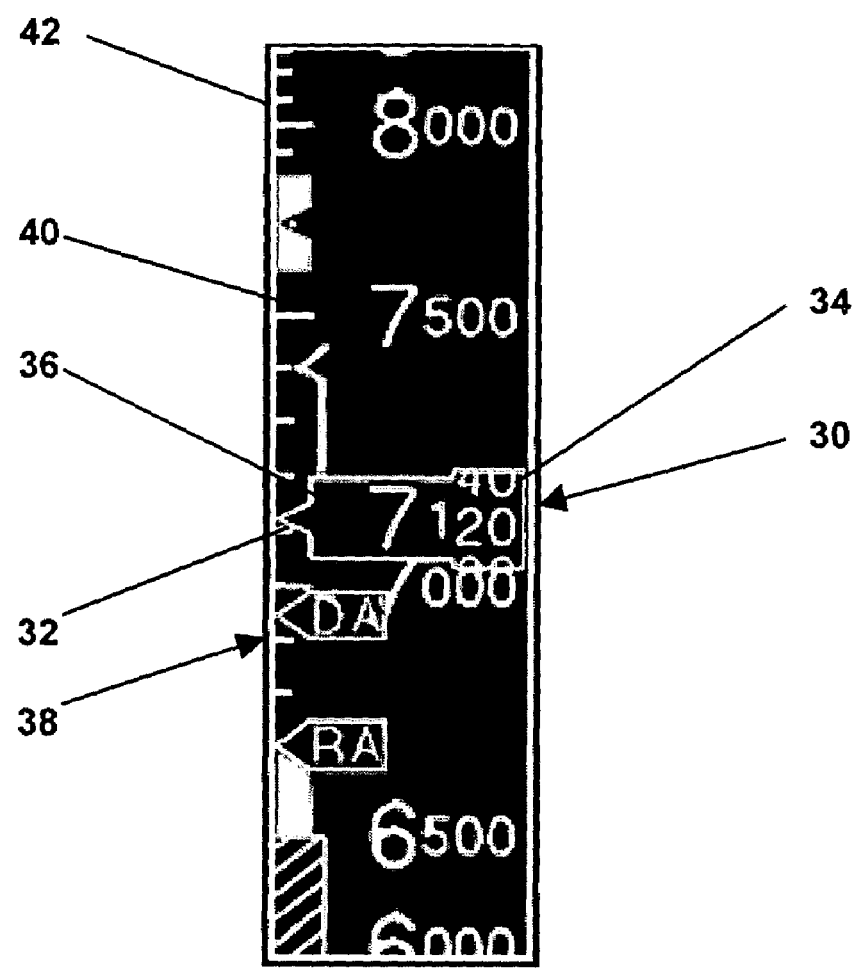
FIG. 2 illustrates an example embodiment of the altitude display of the present invention.
Figure 3:
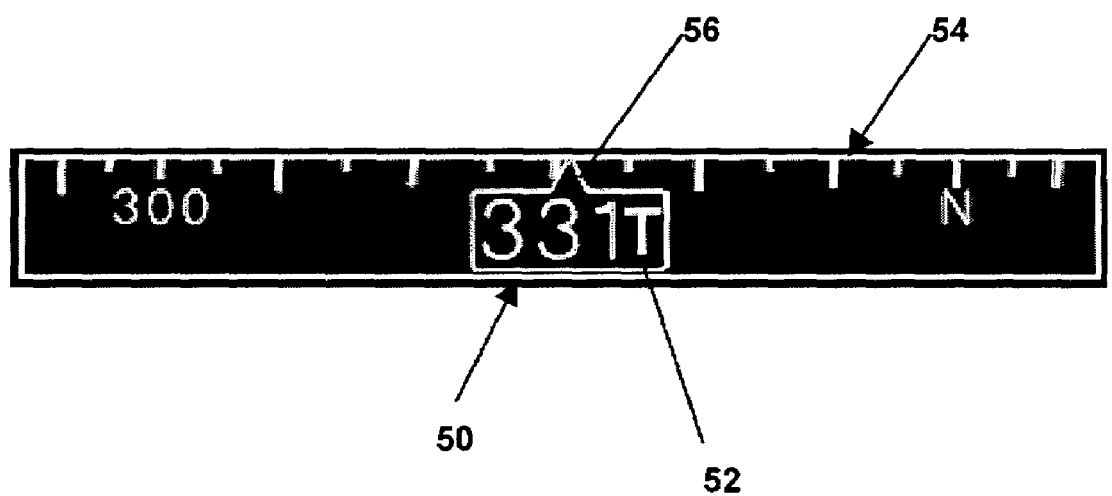
FIG. 3 illustrates an example embodiment of the heading display of the present invention.

As can be noted in FIGS. 1–3 of the example embodiments of the present invention, the object of the present invention is to provide a nonlinear scale that emulates the view of a mechanical drum gauge. More specifically, the nonlinear tape display of the present invention provides for a narrowing in the respective distance between the tick marks denoting an equivalent measured amount of a given parameter along the scale as one proceeds from the center of the nonlinear tape emulation to the outside range of values at either end of the scale.

FIG. 1 illustrates an example embodiment of an airspeed display of the present invention. The airspeed tape is typically located on the left side of a PFD display and depicts present airspeed and related data to the pilot. As shown in FIG. 1, placed in the vertical center of this tape is the indicated airspeed window 10, shaped with a pointer 12 to the tape on the right side of it, an enlarged area 14 on the right side of it, and a black background 16. This window displays the current airspeed to the nearest knot. As shown on the enlarged area 14, the digits may roll to change with the higher numbers rolling in from the top and lower numbers rolling in from the bottom to emulate the positive actions of a mechanical device.

Behind the current airspeed window 10 is the semi-transparent airspeed tape 18 that may have numerals and indices in white. The full scale of the tape 18 may extend from a configurable lower limit (from 0–100 knots) up to 999 knots, is non-linear to emulate a mechanical drum, and may be spaced so as to center the current airspeed data within a desired range on the nonlinear scale. For example, FIG. 1 shows the current airspeed data centered so that 140 knots (70 knots either side of the current airspeed) are displayed at all times. The tape 18 will scroll such that the current airspeed window 10 always points to the current airspeed as indicated on the tape. In this example embodiment, the major tick marks, e.g. at 20, may appear every 20 knots on the right side of the tape with a numeral marking to the left. Minor tick marks, e.g. at 22, may appear every 10 knots in between the major tick marks and are not marked numerically. This presentation complies with industry recommended practices.

FIG. 2 illustrates an example embodiment of an altitude display of the present invention. The altitude tape is typically displayed on the right side of the PFD, centered vertically on the display center horizon line. Placed in the vertical center of the tape is the current altitude window 30, shaped with a pointer 32 to the tape on the left side of it, an enlarged area 34 on the right side of it, and a black background 36 as shown in the figure below. As shown at 30, the window displays the current baro corrected altitude with rolling ones and tens digits in increments of 20 ft. The hundreds, thousands, and ten-thousands digits also independently roll when they change from one value to the next. Increasing altitude numbers roll in from the top, and decreasing altitude numbers roll in from the bottom. The pointer 32 on the left side of the current altitude window points to the corresponding altitude on the moving tape 38 behind the window.

Behind the current altitude window 30 is the semi-transparent nonlinear altitude tape 38 with numerals and indices in white. The scale of the tape may be such that ±1200 feet of altitude are visible on the tape 38 at any time. Major tick marks may appear for increments of every 500 feet on the left side of the tape with a numeral marking to the right, e.g. at 40. Minor tick marks may appear for increments of every 100 feet in between the major tick marks and are not marked numerically, e.g. at 42. The digits on the tape, e.g. at 40, may be aligned to the right with the respective digits in the current altitude window 30.

When the altitude display unit is selected to display units of meters, the text "METERS" may be displayed above the current altitude 30 in amber text (not shown). In addition, a change in the display to units of meters may alter the tape scale so that the major ticks with the associated numeric marking 40 will be indicative of a value of every 100 meters. Likewise, the change to metric units may place the minor ticks, e.g., 42, for every 20 meters. The current altitude window 30 may also display rolling ones and tens digits every 10 meters.

FIG. 3 illustrates an example embodiment of a heading display of the present invention. A non-linear "drum" heading tape is used to present the current aircraft heading on the PFD to the pilot and provide a qualitative depiction of rate of change of heading. Centered in the heading tape is the current heading window 50, which may display a digital value for the current heading. The digital value includes leading zeros, indicates North as 360° (rather than 0°), and indicates only numeric digits, i.e. not N, E, W, S labels. If True heading is selected via menu option or external discrete, an amber "T" 52 may be displayed after the numeric value of the current heading and the current heading window 50 will grow to include it. If heading information is being supplied by a cross-side source, the box, digital value, and "T" (if present) may be displayed in amber. If True Heading is not the current mode, the "T" is not displayed and the heading displayed is Magnetic.

Behind the current heading window 50 is the heading scale 54. It is depicted as a semi-transparent non-linear tape with white vertical tick marks every 10° and slightly shorter vertical tick marks every 5°. Leading zeros are shown on the degree position numbers that compose the scale and the numeric values are limited to two digits, i.e. 60° is shown as 06 and 240° is shown as 24. The tape scrolls left and right such that the current heading window pointer 56 overlaps the current heading as indicated on the tape. The text "N", "W", "S", and "E" appear at the 360°, 270°, 180°, and 90° headings respectively on the nonlinear scale; however, the numerical values for heading will appear in the current heading window 50.

Having shown and described example embodiments of the present invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

We claim:

1. An electronic display for presenting airspeed data of an aircraft, comprising:
   an electronic airspeed tape having a scrolling nonlinear scale emulating the view of a mechanical drum gauge;
   wherein the mechanical drum gauge view is maintained upon scrolling of the tape to display a current value of the airspeed.

2. The electronic display of claim 1, wherein said airspeed data of an aircraft is centered on a showing of said nonlinear scale on said display.

3. The electronic display of claim 1, wherein said display is configured to emulate the view of a mechanical drum gauge in units of knots.

4. The electronic display of claim 3, wherein said airspeed data of an aircraft is centered on a showing of said nonlinear scale of 140 knots on said display.

5. The electronic display of claim 1, further comprising an indicated airspeed window showing the current airspeed of said aircraft.

6. The electronic display of claim 5, wherein said indicated airspeed window is comprised of a shaped pointer.

7. The electronic display of claim 5, wherein said indicated airspeed window is comprised of an enlarged display of at least a portion of said electronic airspeed tape.

8. The electronic display of claim 5, wherein said indicated airspeed window is comprised of a black background.

9. The electronic display of claim 1, wherein said nonlinear scale is configurable from a lower limit to an upper limit.

10. The electronic display of claim 9, wherein said lower limit is fixed.

11. The electronic display of claim 9, wherein said upper limit is fixed.

12. The electronic display of claim 9, wherein said lower limit is 0 (zero) knots.

13. The electronic display of claim 9, wherein said configurable lower limit is bounded by 0 (zero) to 100 (one hundred) knots.

14. The electronic display of claim 9, wherein said upper limit is 999 knots.

15. An electronic display for presenting altitude data of an aircraft, comprising:
    an electronic altitude tape having a scrolling nonlinear scale emulating the view of a mechanical drum gauge;
    wherein the mechanical drum gauge view is maintained upon scrolling of the tape to display a current value of the altitude.

16. The electronic display of claim 15, wherein said altitude data of an aircraft is centered on a showing of said nonlinear scale on said display.

17. The electronic display of claim 15, wherein said display is configured to emulate the view of a mechanical drum gauge in units of feet.

18. The electronic display of claim 17, wherein said altitude data of an aircraft is centered on a showing of said nonlinear scale of 1,200 (one thousand and two hundred) feet of altitude on said display.

19. The electronic display of claim 15, wherein said display is configured to emulate the view of a mechanical drum gauge in units of meters.

20. The electronic display of claim 19, wherein said altitude data of an aircraft is centered on a showing of said nonlinear scale measured in meters approximately equivalent to 1,200 feet of altitude on said display.

21. The electronic display of claim 15, wherein display is configurable to emulate the view of a mechanical drum gauge in units of feet or in units of meters.

22. The electronic display of claim 15, further comprising an indicated altitude window showing the current altitude of said aircraft.

23. The electronic display of claim 22 wherein said indicated altitude window is comprised of an enlarged display of at least a portion of said electronic altitude tape.

24. The electronic display of claim 22, wherein said indicated altitude window is comprised of a numeric display of the current altitude of said aircraft.

25. The electronic display of claim 24, wherein said numeric display is an electronic emulation of a mechanical rolling numeric display.

26. The electronic display of claim 22, wherein said indicated altitude window is comprised of a black background.

27. An electronic display for presenting heading data of an aircraft, comprising:
an electronic heading tape having a scrolling nonlinear scale emulating the view of a mechanical drum gauge;
wherein the mechanical drum gauge view is maintained upon scrolling of the tape to display a current heading.

28. The electronic display of claim 27, wherein said electronic heading tape emulation of the view of a mechanical drum gauge is comprised of text markings of "N", "W", "S", and "E" at 360.degree., 270.degree., 180.degree., and 90.degree. headings, respectively.

29. The electronic display of claim 27, further comprising a heading window showing the current heading of said aircraft.

30. The electronic display of claim 29, wherein said current heading of said aircraft is selected from the group consisting of true beading and magnetic heading.

31. The electronic display of claim 29, wherein said showing the current heading of said aircraft is comprised of a "T" to indicate a display of true heading of said aircraft.

32. The electronic display of claim 29, wherein said heading window is comprised of a shaped pointer.

33. The electronic display of claim 29, wherein said heading window is comprised of an enlarged display of at least a portion of said electronic heading tape.

34. The electronic display of claim 29, wherein said heading window is comprised of a numeric display of the current heading of said aircraft.

35. The electronic display of claim 29, wherein said heading window is comprised of a black background.

36. An electronic display for presenting data of an aircraft, comprising:
an electronic tape having a scrolling nonlinear scale emulating the view of a mechanical drum gauge;
wherein the mechanical drum gauge view is maintained upon scrolling of the tape to display a current value of the data.

37. The electronic display of claim 36, further comprising a window showing the current data of said aircraft.

38. The electronic display of claim 37, wherein said window is comprised of a shaped pointer.

39. The electronic display of claim 37, wherein said window is comprised of a numeric display of the current data of said aircraft.

40. The electronic display of claim 37, wherein said window is comprised of a black background.

41. An electronic display presenting data of an aircraft, the display comprising:
an electronic tape having a scrolling nonlinear scale having moving scale tick marks, wherein current data is shown at a middle portion of the electronic tape and spacing between the scale marks decreases nonlinearly as the distance of the scale tick marks from the middle portion increases thereby emulating a mechanical drum gauge to a viewer.

42. The display of claim 41 wherein the data presented is dynamic heading data.

43. The display of claim 41 wherein the data presented is dynamic altitude data.

* * * * *